United States Patent [19]
Dessen

[11] Patent Number: 5,573,792
[45] Date of Patent: Nov. 12, 1996

[54] METHOD OF GROWING FISH OR CRUSTACEANS AT INCREASED CONVERSION, GROWTH AND SURVIVAL RATES

[75] Inventor: Arne Dessen, London, England

[73] Assignee: ISP Investments Inc., Wilmington, Del.

[21] Appl. No.: 493,731

[22] Filed: Jun. 22, 1995

Related U.S. Application Data

[63] Continuation of Ser. No. 337,696, Nov. 10, 1994, abandoned, which is a continuation-in-part of Ser. No. 71,914, Jun. 3, 1993, abandoned.

[51] Int. Cl.⁶ .......................................... A23L 1/326
[52] U.S. Cl. ..................... 426/2; 426/272; 426/643; 426/516; 426/805
[58] Field of Search .................... 426/1, 89, 279, 426/285, 302, 2, 643, 657, 805, 807, 272, 516, 454; 43/100

[56] References Cited

U.S. PATENT DOCUMENTS

| | | | |
|---|---|---|---|
| 3,993,746 | 11/1976 | Beigler et al. | 424/78 |
| 4,283,400 | 8/1981 | von Bittera et al. | 426/2 |
| 4,741,904 | 5/1988 | Smith | 426/1 |

FOREIGN PATENT DOCUMENTS

| | | |
|---|---|---|
| 2036106 | 1/1972 | Germany. |
| 1269975 | 4/1972 | United Kingdom. |

OTHER PUBLICATIONS

G. Hawley. 1981. Condensed Chemical Dictionary, Van Nostrand Reinhold Co. New York. p. 820.

*Primary Examiner*—Anthony J. Weier
*Attorney, Agent, or Firm*—Walter Katz; Marilyn J. Maue; Joshua J. Ward

[57] ABSTRACT

A method of growing fish and crustaceans at increased conversion, growth and survival rates by feeding the fish or crustacean with a particulate foodstuff composition which includes polyvinylpyrrolidone (PVP) having a K-value of 15–120 to bind said foodstuff in the form of a pellet of sufficient strength and hardness in water to enable the fish or crustaceans to feed effectively on said composition during both their early and late growth stages.

5 Claims, No Drawings

METHOD OF GROWING FISH OR CRUSTACEANS AT INCREASED CONVERSION, GROWTH AND SURVIVAL RATES

CROSS REFERENCE TO RELATED APPLICATION

This is a continuation of application Ser. No. 08/337,696, filed Nov. 10, 1994 now abandoned which is a continuation-in-part of U.S. Ser. No. 08/071,914, filed Jun. 3, 1993 now abandoned.

BACKGROUND OF THE INVENTION

1. Field of the Invention

This invention relates to growing fish or crustaceans, and, more particularly, to feeding the fish or crustacean with a particulate foodstuff composition to increase their conversion, growth and survival rates.

2. Description of the Prior Art

Farm fishing of fish and crustaceans is a world-wide business activity. It is customary to manufacture fish foods used in farm fishing in the form of discrete granules or pellets so as to facilitate handling of the foods, reduce dust and wastage, and to control the food particle size and density. For the manufacture of such fish foods, it has been conventional for many years to incorporate a polymeric binder material as a part of the composition.

Lignosulphonate is widely used as a binder, notably in the pelleting of start feeds, that is, for very young, fast growing fish. Alginates and guar gum also are used as binders for this purpose, generally in moist feeds for larger fish. Although these binder materials are generally regarded as benign, it has been known for some years that they do interfere to some extent with digestion of the foodstuffs by the fish. This limitation, however, has been accepted for the sake of manufacturing the feeds in particulate form.

Starch is also used as a binder in extruded fish feeds for larger fish, but it is less effective as a binder so that a substantial amount is required, generally at levels of about 20%. Such high levels of starch alters the natural diet of the fish.

Accordingly, it is an object of this invention to provide an improved method of growing fish or crustaceans at increased conversion, growth and survival rates.

Another object herein is to provide a method of feeding the fish or crustacean with a particulate foodstuff composition to bind said foodstuff in the form of a pellet of sufficient strength and hardness in water to enable the fish or crustaceans to feed effectively on said composition during both their early and late growth stages.

SUMMARY OF THE INVENTION

What is described herein is a method of growing fish and crustaceans at increased conversion, growth and survival rates by feeding the fish or crustacean with a particulate foodstuff composition which includes polyvinylpyrrolidone (PVP) having a K-value of 15–120 to bind said foodstuff in the form of a pellet of sufficient strength and hardness in water to enable the fish or crustaceans to feed effectively on said composition during both their early and late growth stages.

A method of growing fish or crustaceans at increased conversion, growth and survival rated comprising deeding the fish or crustacean with a particulate foodstuff composition which consists essentially of at least 30% fish meal and at least 0.01 to up to 5% by weight of polyvinylpyrrolidone (PVP) having a K-value of 15–120 to bind said foodstuff in the form of a pellet of sufficient strength and hardness in water to remain intact on water, to prevent any ingredient therein from escaping therefrom, and to enable the fish or crustaceans th feed effectively on said pelletized composition during both their early and late growth stages.

DETAILED DESCRIPTION OF THE INVENTION

In accordance with the invention, the polyvinylpyrrolidone (PVP) binder used herein may be a homopolymer or copolymer of vinylpyrrolidone and may be a linear polymer or a crosslinked polymer. Crosslinked polymers of vinylpyrrolidone are known as polyvinylpyrrolidone (PVP). If the polymer is a copolymer it may be preferred that at least 50% or even at least 80% of the monomer units are vinylpyrrolidone.

Polyvinylpyrrolidone homopolymer is commercially available with various chain lengths and hence various molecular weights. These different grades of polyvinylpyrrolidone are often identified by K-values which are a measure of viscosity and hence are related to the molecular weight and degree of polymerization in the polymer. For the present invention it is preferred that the PVP polymer should have a K-value of at least 15. PVP is available commercially with K-values up to 120. Polymers of this K-value (or higher) may be used but it is preferred to employ polymers with a K-value in the range 15–100, most preferably K-29/32.

The foodstuffs incorporated into the particulate fish foods of this invention may be those which are normally used for other particulate fish foods. Frequently fish meal will provide at least 30% of the formulation and often it will provide at least 50% of the formulation.

Particulate fish foods are customarily manufactured by three routes, all of which involve some form of extrusion through a die. The methods are normally classified as compressed pelleting (also known as steam pelleting),/ extruded pelleting and moist pelleting.

In compressed pelleting the mixture of foodstuffs is exposed to dry steam, which heats it and increases the moisture content, after which it is forced through holes in a die by means of a roller inside the die. The mixture is compressed during passage through the die; then the compressed extrudate is chopped to size as it leaves the die.

Extrusion pelleting also uses an extrusion step, but the heated mixture is at markedly higher pressure upstream of the die than downstream of the die. This leads to expansion and evaporation of moisture as the mixture leaves the extrusion die, causing the formation of voids and reducing the density of the pellets.

Moist pelleting entails the extrusion of a wet mixture into noodles which are then cut to size. PVP polymers can be used as a binder in all three of these processes, adding the binder to the mixture of foodstuffs before extrusion of the mixture, in generally the same manner as with binder materials used hitherto. For extruded pellets it is convenient to mix the PVP with water and then mix the resulting solution or dispersion with the foodstuffs. For moist pelleting the polymer can be added in powder form while mixing the foodstuffs.

The amount of PVP polymer incorporated into a fish food will be enough to bind the foodstuff in the form of a pellet of sufficient strength and hardness in water to enable the fish or crustacean to feed effectively on the food composition during both their early and late growth stages. Mixtures of PVP and other binder materials also may be used as long as the presence of PVP therein will provide the pellet with the desired and necessary strength and hardness in water over both short and long periods of feeding time as to provide effective fish feeding. Suitably at least 0.01% by weight of the composition is PVP, and usually about 0.01% to 5%.

The mean particle size of such a particulate fish food may be as small as 0.1 mm, preferably at least 0.2 mm, while pellets may have dimensions up to 20 mm.

Feeds embodying the present invention may be used in the farming of both crustaceans and vertebrate fish, such as salmon, catfish, lobster, shrimp and the like, both in fresh and salt water.

The invention will now be illustrated further by the following example and comparative example.

EXAMPLE

Fish feeds for salmon fry were prepared by the compressed pelleting technique using 2% and 5% PVP as binders. For comparative testing, two fish feeds also were prepared using 2% and 5% lignosulphonate. The compositions are set out in Table 1 below. The polyvinylpyrrolidone was a linear homopolymer of vinylpyrrolidone having a K-value of approximately 30 and available as Plasdone K-29/32 from International Specialty Products, Wayne, N.J., USA.

TABLE 1

Formulation and chemical composition of the diets.

| | % by weight | | | |
|---|---|---|---|---|
| | Diet 1 | Diet 2 | Diet 3 | Diet 4 |
| Formulation, | | | | |
| Fish meal[1] | 67.3 | 65.4 | 67.3 | 65.4 |
| Extruded Wheat | 12.8 | 12.4 | 12.8 | 12.4 |
| Fish oil[2] | 11.0 | 11.0 | 11.8 | 11.0 |
| "FINNSTIM"[3] | 4.7 | 4.9 | 4.7 | 4.9 |
| Soya Lecithin[4] | 0.9 | 0.8 | 0.9 | 0.8 |
| Vitamin- and micro-mineral-mix[5] | 0.5 | 0.5 | 0.5 | 0.5 |
| Lignosulphonate[6] | 2.0 | 5.0 | 0 | 0 |
| PVP | 0 | 0 | 2.0 | 5.0 |
| Chemical Composition | | | | |
| Dry matter (DM), % | 90.8 | 90.8 | 90.9 | 90.8 |
| Protein, % DM | 47.7 | 45.2 | 48.1 | 48.3 |

TABLE 1-continued

Formulation and chemical composition of the diets.

| | % by weight | | | |
|---|---|---|---|---|
| | Diet 1 | Diet 2 | Diet 3 | Diet 4 |
| Starch, % DM | 20.4 | 20.3 | 18.6 | 19.1 |
| Fat, % DM | 20.4 | 19.9 | 20.1 | 20.0 |

[1]NORSE LT-94. Norsildmel, Bergen, Norway.
[2]NOR SALMOIL. Norsildmel, Bergen, Norway.
[3]Betain-rich by-product from sugar production. Finsugar, Finland.
[4]NUTRIPUR. Lucas Meyer, Hamburg, Germany.
[5]Storebakken and Austreng (1978b).
[6]BORREBOND. Borregaard Fabrikker, Sarpsborg, Norway.

Four directly analogous feeds were prepared in the same way using modified proportions of the foodstuffs but the same amounts of binders so as to produce fish foods with a reduced fat content (12% fat as % dry matter).

Feeds were used for comparative experiments in which the feeds were used as the sole feed for Atlantic salmon fry in fresh water over a period of 112 days. Salmon fry were selected as the fish for use in these comparative experiments because they are one of the most sensitive species towards feed ingredients in the start feeding phase.

For this experiment Atlantic salmon fry with an initial average weight of 0.2 gram were maintained in non-metallic tanks and supplied with fresh water at 10°–12° C. which initially held 600 fish per tank. The feed was delivered automatically to the tank every 10 minutes, 24 hours per day, at a feed rate expected to provide the fish with an excess of food. Dead fish were removed from the tanks and counted daily. At 28 day intervals 15 fish were removed from each tank and their body composition was determined by analysis. At the end of the experiment histological examinations of liver, kidney and gastrointestinal system were carried out on groups of 30 fish fed with each diet.

Each of the fish feeds set out in Table 1 above was used as sole feed for a group of 3 tanks of fish during the second, third and fourth periods of 28 days in the experiment. During the first 28 day period the corresponding fish feeds with 12% fat content were used.

Results from the experiment are set out in the following Table 2 where "final weight" denotes the mean weight of live fish at the end of each 28 day period, "BWI" denotes the mean body weight increase per fish expressed as a percentage of final weight, "feed:gain ratio" is the weight of feed supplied divided by the increase in weight of the surviving fish.

Experimental error values are values of the "standard error of the mean" which is the standard deviation divided by the square root of the number of observations.

TABLE 2

Growth, feed conversion and mortality of the salmon fry during the experiment

|  | Diet 1 | Diet 2 | Diet 3 | Diet 4 |
|---|---|---|---|---|
| 0–28 days | | | | |
| Final weight | $0.39 \pm 0.01^b$ | $0.28 \pm 0.02^c$ | $0.44 \pm 0.02^a$ | $0.46 \pm 0.01^a$ |
| BWI, % $d^{-1}$ | $3.22 \pm 0.14^b$ | $1.45 \pm 0.40^c$ | $4.10 \pm 0.30^a$ | $4.52 \pm 0.16^a$ |
| Feed:gain ratio, g/g | $1.9 \pm 0.15$ | >10 | $1.2 \pm 0.09$ | $1.1 \pm 0.06$ |
| Mortality, % | $4.0 \pm 1.74^b$ | $24.5 \pm 3.11^a$ | $3.1 \pm 0.15^c$ | $5.4 \pm 2.06^c$ |
| Cumulative survival, % | $86.0 \pm 1.74^b$ | $75.5 \pm 3.11^a$ | $96.9 \pm 0.15^c$ | $94.6 \pm 2.06^c$ |
| 29–56 days | | | | |
| Final weight | $1.20 \pm 0.06^a$ | $0.84 \pm 0.02^b$ | $1.21 \pm 0.04^a$ | $1.25 \pm 0.01^a$ |
| BWI, % $d^{-1}$ | $6.70 \pm 0.30$ | $5.97 \pm 0.22$ | $6.34 \pm 0.09$ | $6.55 \pm 0.22$ |
| Feed:gain ratio, g/g | $1.3 \pm 0.07^b$ | $2.9 \pm 0.08^a$ | $1.1 \pm 0.03^c$ | $1.0 \pm 0.00^c$ |
| Mortality, % | $2.7 \pm 0.87^b$ | $13.5 \pm 1.20^a$ | $1.6 \pm 0.36^b$ | $1.2 \pm 0.36^b$ |
| Cumulative survival, % | $83.2 \pm 1.44^b$ | $65.3 \pm 3.22^a$ | $95.4 \pm 0.27^c$ | $93.4 \pm 2.18^c$ |
| 57–84 days | | | | |
| Final weight | $2.28 \pm 0.10^a$ | $1.42 \pm 0.02^b$ | $2.36 \pm 0.06^a$ | $2.61 \pm 0.06^a$ |
| BWI, % $d^{-1}$ | $3.14 \pm 0.04^a$ | $1.97 \pm 0.47^b$ | $3.41 \pm 0.04^a$ | $3.34 \pm 0.15^b$ |
| Feed:gain ratio, g/g | $2.5 \pm 0.13^b$ | $8.3 \pm 1.41^b$ | $1.9 \pm 0.07^c$ | $1.0 \pm 0.09^c$ |
| Mortality, % | $0.1 \pm 0.87^b$ | $2.1 \pm 1.46^a$ | $0.6 \pm 0.16^b$ | $0.4 \pm 0.10^a$ |
| Cumulative survival, % | $83.2 \pm 1.44^b$ | $64.4 \pm 3.69^a$ | $94.8 \pm 0.15^c$ | $93.0 \pm 0.15^c$ |
| 85–112 days | | | | |
| Final weight | $3.58 \pm 0.25^a$ | $1.89 \pm 0.21^b$ | $3.95 \pm 0.11^a$ | $4.04 \pm 0.01^a$ |
| BWI, % $d^{-1}$ | $2.02 \pm 0.16$ | $0.95 \pm 0.54$ | $2.41 \pm 0.03$ | $2.43 \pm 0.12$ |
| Feed:gain ratio, g/g | $3.45 \pm 0.08^b$ | $9.9 \pm 1.01^a$ | $2.24 \pm 0.09^b$ | $2.10 \pm 0.05^b$ |
| Mortality, % | $0.0 \pm 0.00^b$ | $0.9 \pm 0.14^a$ | $0.1 \pm 0.06^b$ | $0.0 \pm 0.00^b$ |
| Cumulative survival, % | $83.2 \pm 1.44^b$ | $63.8 \pm 3.63^a$ | $94.7 \pm 0.19^c$ | $93.0 \pm 2.03^c$ |

In Table 2 above the superscripts a, b and c are used in each horizontal row of the Table to separate the results into groups which are significantly different from each other. Thus for example in the first line of the Table giving final weight of fish after 28 days the final weights for fish fed with diet 3 and 4 are not significantly different from each other, but are both significantly greater than the final weight of fish fed with diet 1 which in turn was significantly greater than the final weight for fish fed with diet 2.

As can be seen from Table 2, growth during the start period (the first 28 days) was significantly better for fish fed with diets 3 and 4, which used PVP as binder, than for those fed with diets 1 and 2. In subsequent periods fish fed with diet 2 containing the higher level (5%) of lignosulphonate grew less than those fed with the other diets.

The feed conversion rates, expressed by the feed:gain ratio, were remarkably good for the fish fed with diets 3 and 4 which used PVP as binder. They were significantly better at all stages of the experiment than those for diet 2 with 5% lignosulphonate, and significantly better than those for diet 1, with 2% lignosulphonate, in all but the last 28 day period.

The low values of the feed:gain ratio observed in the second 28 day period led to some doubt as to whether the amount of feed was in fact satiating the fish as intended. The amount of feed was therefore increased for all four diets during the last two 28 day periods. It was increased from 120% of the predicted amount to 130% of the amount predicted to satiate the fish.

The high growth rate of fish fed on diets 3 and 4 was accompanied by high survival. Fish on diet 1 (2% lignosulphonate) suffered significantly higher mortality in the start period while throughout the experiment those fish on diet 2 (5% lignosulphonate) showed significantly higher mortality than those fish fed with diets 3 or 4.

Table 3 shows the body composition of fish sampled during the experiment (chemical analysis carried out as described by Storebakken and Austreng (1987 Aquaculture, 60:189–206)).

TABLE 3

Body composition (as % of total wet weight of whole fish) of the salmon fry during the experiment

|  | Diet 1 | Diet 2 | Diet 3 | Diet 4 |
|---|---|---|---|---|
| 28 days | | | | |
| Dry matter | $17.9 \pm 0.06^a$ | $17.0 \pm 0.26^b$ | $18.2 \pm 0.15^b$ | $18.1 \pm 0.27^a$ |

TABLE 3-continued

| Body composition (as % of total wet weight of whole fish) of the salmon fry during the experiment | | | | |
|---|---|---|---|---|
| | Diet 1 | Diet 2 | Diet 3 | Diet 4 |
| Protein | 12.1 ± 0.06 | 12.4 ± 0.43 | 12.5 ± 0.25 | 12.7 ± 0.34 |
| Fat | 2.7 ± 0.07$^a$ | 2.1 ± 8.14$^b$ | 2.8 ± 0.23$^a$ | 2.7 ± 0.10$^a$ |
| Ash | 1.6 ± 0.03 | 1.7 ± 0.08 | 1.7 ± 0.03 | 1.8 ± 0.01 |
| 56 days | | | | |
| Dry matter | 22.2 ± 0.03$^a$ | 20.8 ± 0.05$^b$ | 21.8 ± 0.16$^a$ | 21.9 ± 0.21$^a$ |
| Protein | 12.8 ± 0.07 | 12.7 ± 0.06 | 12.9 ± 0.10 | 12.9 ± 0.07 |
| Fat | 6.2 ± 0.09$^a$ | 5.0 ± 0.11$^b$ | 6.2 ± 0.13$^a$ | 6.1 ± 0.11$^a$ |
| Ash | 1.9 ± 0.02$^a$ | 1.9 ± 0.01$^a$ | 1.8 ± 0.01$^b$ | 1.8 ± 0.02$^{ab}$ |
| 84 days | | | | |
| Dry matter | 22.5 ± 1.88 | 24.0 ± 0.25 | 24.7 ± 0.14 | 24.7 ± 0.39 |
| Protein | 14.0 ± 0.14 | 14.0 ± 0.09 | 14.1 ± 0.06 | 13.9 ± 0.13 |
| Fat | 7.4 ± 0.07$^a$ | 6.9 ± 0.15$^a$ | 7.7 ± 0.15$^a$ | 7.8 ± 0.26$^a$ |
| Ash | 2.1 ± 0.07 | 2.2 ± 0.01 | 2.1 ± 0.04 | 1.8 ± 0.01 |
| 112 days | | | | |
| Dry matter | 25.6 ± 0.07$^a$ | 25.0 ± 0.20$^b$ | 25.8 ± 0.25$^a$ | 25.7 ± 00.10$^a$ |
| Protein | 14.4 ± 0.35 | 14.7 ± 0.06 | 14.8 ± 0.13 | 16.4 ± 0.13 |
| Fat | 7.7 ± 0.11$^b$ | 7.2 ± 0.16$^c$ | 8.0 ± 0.14$^{ab}$ | 8.1 ± 0.10$^a$ |
| Ash | 2.2 ± 0.03$^b$ | 2.3 ± 0.04$^a$ | 2.2 ± 0.03$^b$ | 2.2 ± 0.05$^b$ |

In general, fish fed with diet 2 had a leaner body composition than the other groups of fish. This corresponded to the lower body weight and growth levels.

In the histological examinations at the end of the experiment haemocrit values for the blood of fish fed with diets 3 and 4 were somewhat higher than the haemocrit values for blood from fish fed with the diets 1 and 2 containing lignosulphonate although the only comparison which was statistically significant was diets 3 and 4 against diet 2.

In the examination of intestine and kidney no systemic local toxic effects were observed for any of the four groups of fish. When examining the livers of fish some variation was found between individuals but the occurrence of pathological features was in any event at a low level.

From these results it can be seen that the feeds containing polyvinylpyrrolidone as binder at both 2% and at 5% levels gave significantly increased feed conversion, growth and survival rates, especially in the start period, compared to the feeds containing lignosulphonate as binder.

While the invention has been described with particular reference to certain embodiments thereof, it will be understood that changes and modifications may be made which are within the skill of the art. Accordingly, it is intended to be bound only by the following claims, in which:

What is claimed is:

1. A method of growing fish or crustaceans at increased conversion, growth and survival rates comprising feeding the fish or crustacean with a particulate foodstuff composition which consists essentially of at least 30% fish meal and at least 0.01 to up to 5% by weight of polyvinylpyrrolidone (PVP) having a K-value of 15–120 to bind said foodstuff in the form of a pellet of sufficient strength and hardness in water to remain intact in water, to prevent any ingredient therein from escaping therefrom, and to enable the fish or crustaceans to feed effectively on said pelletized composition during both their early and late growth stages.

2. A method according to claim 1 wherein PVP is included in a mixture of binders which also includes one or more of the group selected from lignosulfate, alginate, guar gum and starch.

3. A method according to claim 1 wherein said fish or crustacean is selected from the group consisting of salmon, catfish, lobster and shrimp.

4. A method according to claim 1 wherein said fish is salmon.

5. A method according to claim 1 wherein the fish composition contains at least 11% fish oil.

* * * * *